United States Patent [19]

Campbell

[11] Patent Number: 4,523,671

[45] Date of Patent: Jun. 18, 1985

[54] APPARATUS FOR MULTIPLE LANE STACKING

[75] Inventor: James F. Campbell, Green Bay, Wis.

[73] Assignee: Paper Converting Machine Company, Green Bay, Wis.

[21] Appl. No.: 506,508

[22] Filed: Jun. 21, 1983

[51] Int. Cl.³ .............................................. B65G 57/09
[52] U.S. Cl. .................................... 198/422; 198/429; 198/441; 271/196; 271/299; 414/46; 414/51
[58] Field of Search .................. 414/31, 51, 54, 72, 414/43, 46; 198/366, 374, 377, 438, 441, 478, 436; 271/196, 287, 297, 298, 299, 185, 194, 195, 276, 65

[56] References Cited

U.S. PATENT DOCUMENTS

| 2,714,439 | 8/1955 | Prickett et al. | 198/436 |
| 3,117,500 | 1/1964 | Donahue et al. | 414/43 |
| 3,580,442 | 5/1971 | Rohdin et al. | 198/458 |
| 4,050,574 | 9/1977 | Chenevard et al. | 414/773 |
| 4,325,475 | 4/1982 | Spalding | 414/46 |

FOREIGN PATENT DOCUMENTS 0379669 8/1932 United Kingdom .
1211001 11/1970 United Kingdom .

Primary Examiner—Leslie J. Paperner
Assistant Examiner—Lyle Kim

[57] ABSTRACT

Selected products moving along an input path are diverted to one of a plurality of output paths for stacking. A rotating drum is positioned between the input path and the output paths, and a plurality of vacuum pucks are mounted on the drum for transverse sliding movement parallel to the axis of rotation. As the puck moves in an arcuate plane between the input path and the output paths, a cam moves the pucks transversely from alignment with an input path into alignment with one of a plurality of output paths.

9 Claims, 10 Drawing Figures

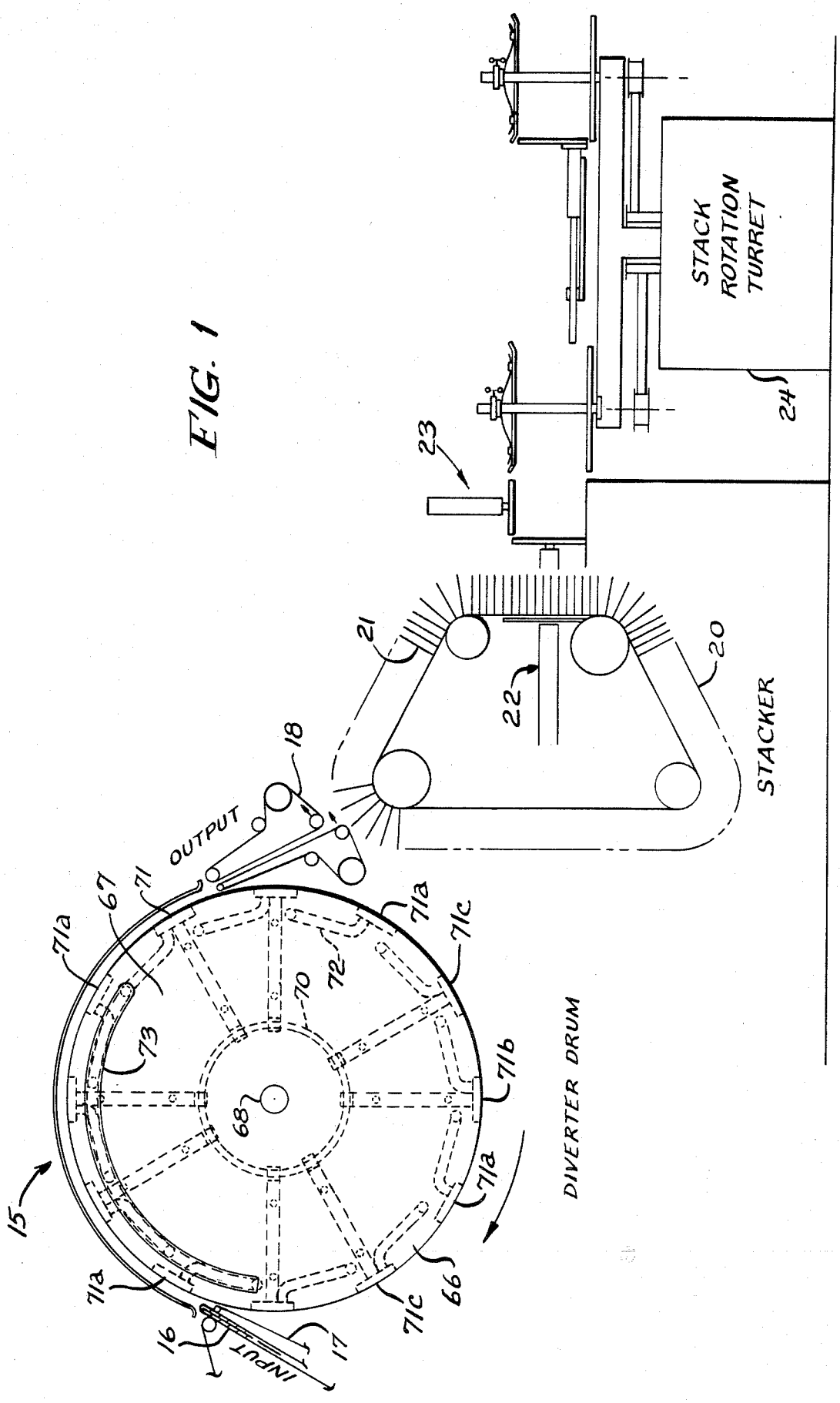

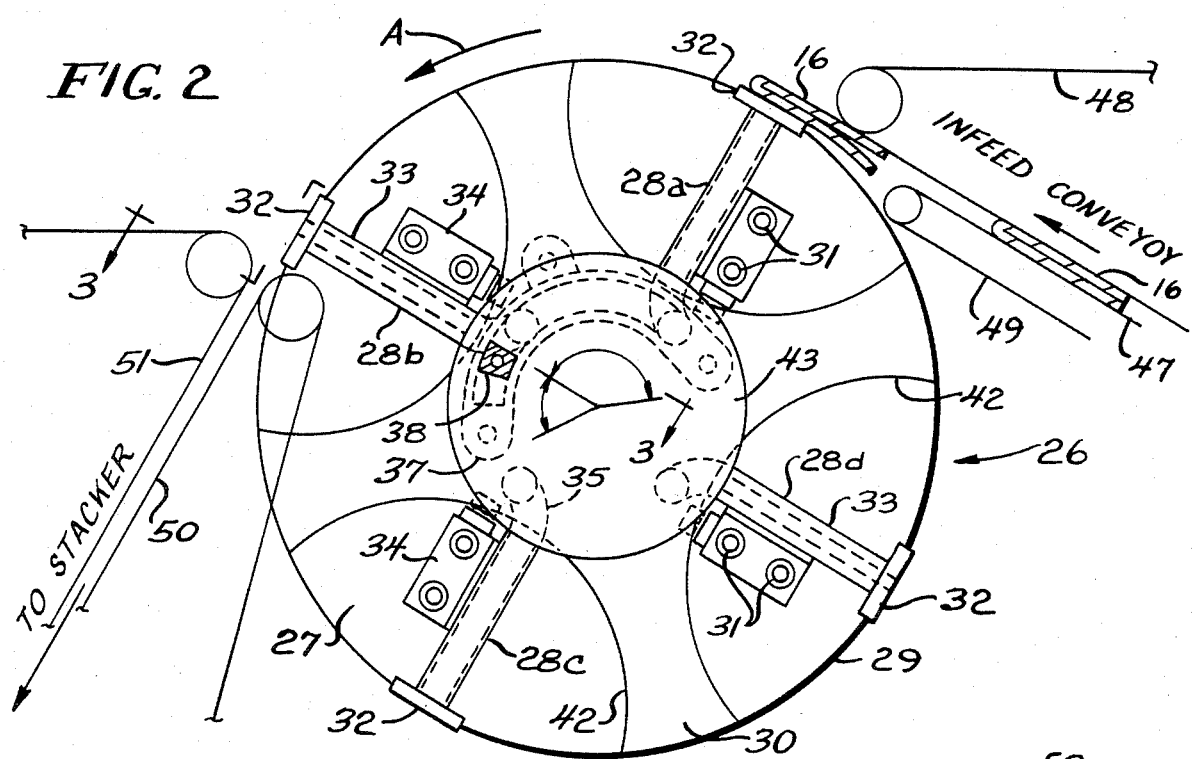
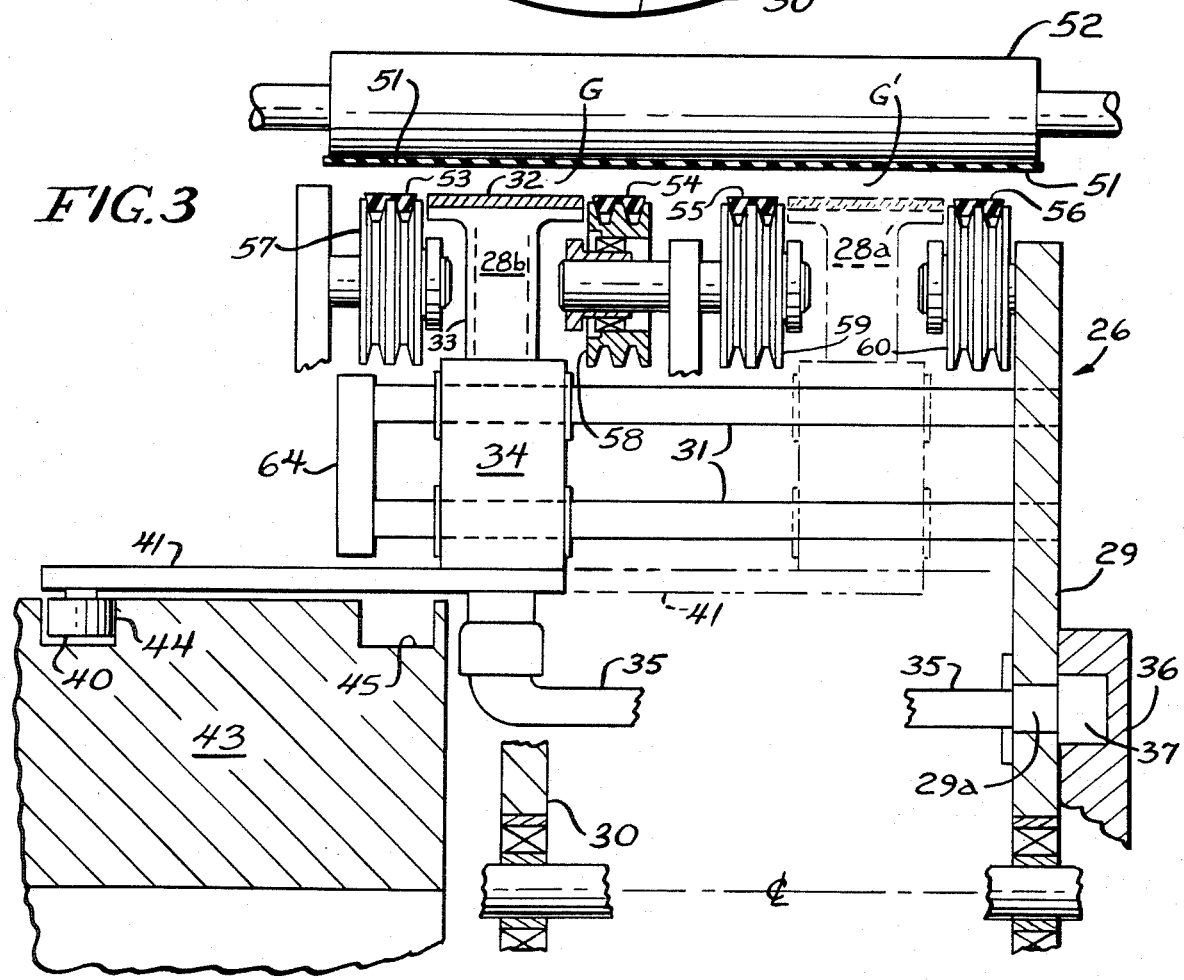

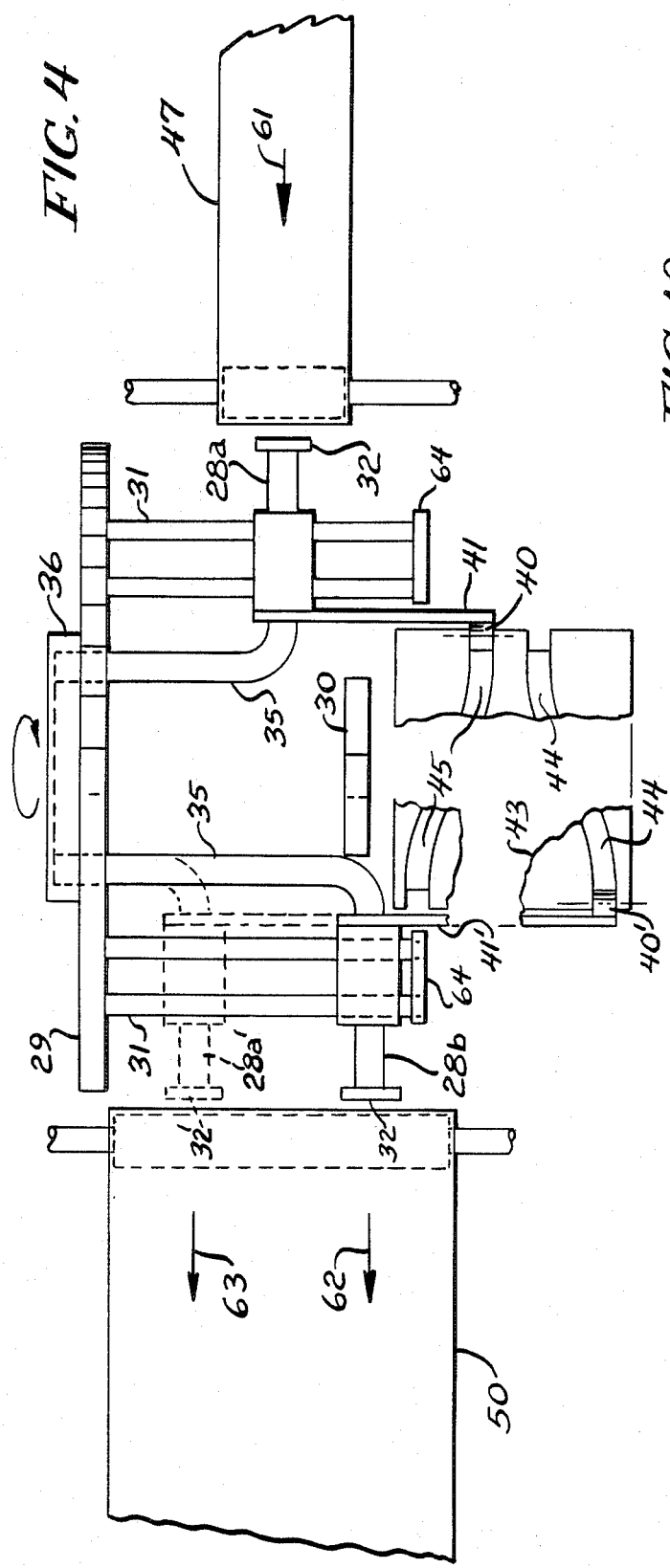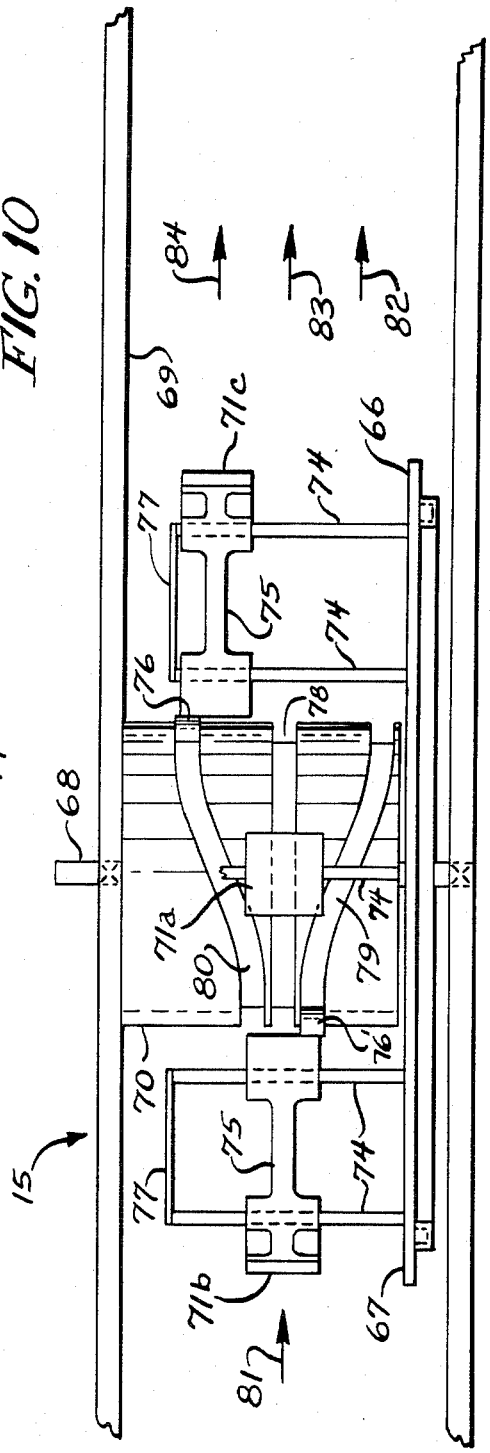

1-LANE INPUT
3 LANE TRANSFER

1-LANE INPUT
2-LANE TRANSFER
TO LEFT

1-LANE INPUT
2-LANE TRANSFER
TO RIGHT

1-LANE INPUT
4-LANE DISCH.

APPARATUS FOR MULTIPLE LANE STACKING

BACKGROUND AND SUMMARY

This invention relates to an apparatus for diverting products from an input path to a plurality of output paths. The invention finds particular utility in diverting diapers for multiple lane stacking, and the invention will be explained in conjunction with diapers.

U.S. Pat. No. 4,325,475 describes an apparatus for stacking a plurality of diapers. When the desired number of diapers is accumulated, a flighted conveyor pauses and a pusher removes the full count stack from the conveyor. Another type of stacker could use a pusher which moves with the flighted conveyor so that the discharge side of the conveyor moves continuously, although at a relatively slow speed.

With either type of stacker the discharge rate of stacked diapers is limited to about 30 to 35 stacks per minute. A typical stack will contain 12 diapers, and the stacking limit is therefore about 30×12 or 360 diapers per minute.

The invention substantially increases the stacking rate by diverting the incoming diapers into two or more lanes. When the diapers are fed to the stacker in two lanes, the discharge rate of the machine is doubled. When the diapers are fed to the stacker in three lanes, the discharge rate of the machine is tripled.

The diverting apparatus includes a rotating drum which is interposed between input means which feeds diapers to the drum and output means which provides a plurality of lanes for feeding diapers to the stacker. A plurality of diaper-holding vacuum pucks are mounted on the drum for transverse sliding movement. parallel to the axis of rotation. Each puck holds a diaper as it moves in an arcuate plane between the input means and the output means, and certain of the pucks are cam-actuated to move transversely along a line parallel to the axis of rotation so that each puck is aligned with an additional lane of the output means by the time the puck reaches the discharge section.

DESCRIPTION OF THE DRAWING

The invention will be explained in conjunction with illustrative embodiments shown in the accompanying drawing, in which—

FIG. 1 is a schematic side elevational view of a three-lane diverting drum formed in accordance with the invention and a three-lane-wide stacker;

FIG. 2 is an enlarged side elevational view of a two-lane diverting drum;

FIG. 3 is a sectional view through the drum of FIG. 2 showing the alternate positions of the diaper-holding puck;

FIG. 4 is a planar perspective view of the diverting drum of FIG. 2;

FIG. 10 is a planar perspective view of the diverting drum of FIG. 1.

DESCRIPTION OF SPECIFIC EMBODIMENTS

Figure 5:
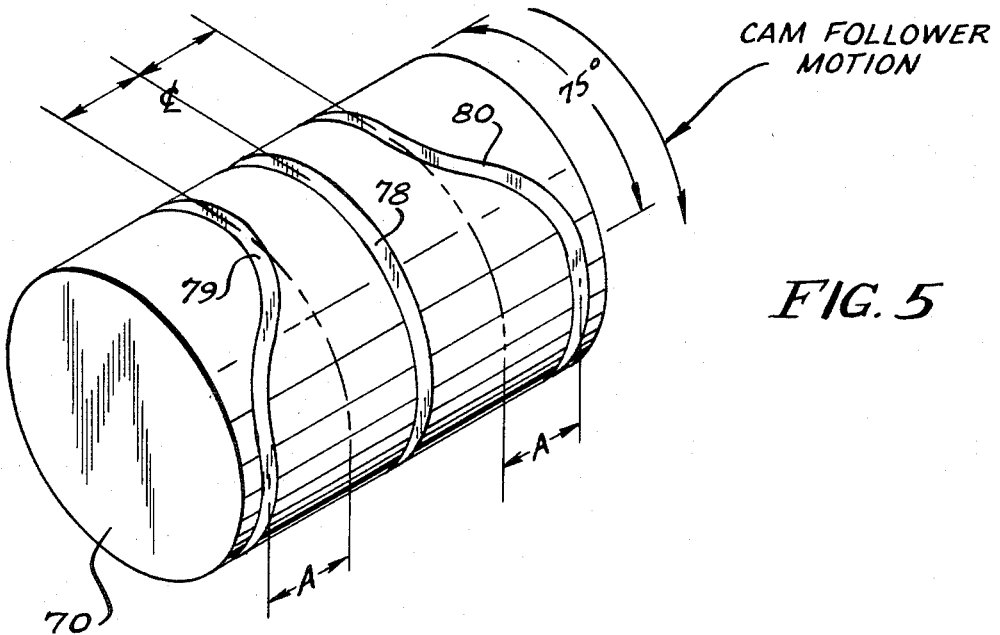
FIG. 5 is a perspective view of a barrel-type cam for use with the three-lane diverting drum of FIG. 1.

Referring first to FIG. 1, the numeral 15 designates generally a diverting assembly which receives serially fed articles 16, such as diapers, from an input conveyor 17 and delivers them to an output conveyor 18. The diapers are carried by the input conveyor along a single input path or lane, and the diverting assembly diverts individual diapers to one of a plurality of output paths or lanes.

The output conveyor carries the diapers along the multiple output lanes and delivers them to a stacker 20. The stacker 20 is described in U.S. Pat. No. 4,325,475 except that the stacker includes a set of stacking fingers 21 for each lane.

The stacker accumulates a stack of diapers for each lane, and a pusher assembly 22 pushes the completed stacks from the fingers 21 to a compressor assembly 23 and then to a stack-rotating turret 24.

FIGS. 2 and 3 illustrates a diverting assembly 26 which is similar to the diverting assembly 15. However, the diverting assembly 26 delivers a diaper 16 to one of only two output lanes. The diverting assembly 26 includes a diverting drum or wheel 27 and four diaper-holding pucks 28a, 28b, 28c, and 28d which are mounted on the drum. It will be recognized that the number of pucks on the drum can vary, with spacing between pucks determining the drum diameter. The number of pucks on the drum must be divisible by the number of output lanes. In the embodiment of FIGS. 2 and 3, the drum includes a pair of side plates 29 and 30 which are suitably joined at the hub or axis of the drum, and each of the pucks is slidably mounted on a pair of rods 31 which are mounted on the side plate 29 and extend parallel to the axis of the drum.

Each of the pucks includes a generally flat vacuum head 32 which is provided with a central opening and a tubular shank 33 which is attached to a slidable housing 34. A pair of support rods 31 extend through each housing, which can be equipped with suitable ball bearings to facilitate sliding movement on the rods. A flexible vacuum hose 35 is attached to each of the pucks via the housing 34 and is connected to an opening 29a in the side plate 29 for connecting the puck to a vacuum valve 36 (FIG. 3).

The vacuum valve 36 is connected to a suitable vacuum source and includes an arcuate slot 37 (FIGS. 2 and 3). As the drum 27 rotates, a vacuum is provided in each of the pucks for that portion of the cycle in which the vacuum line 35 for the puck communicates with the slot 37. The slot 37 extends over an arc of about 180°, but the effective length of the slot can be adjusted as desired by inserting a plug 38 (FIG. 2) in the vacuum slot 37.

A cam follower 40 (FIG. 3) is mounted on each of the slidable housings 34 by a support arm 41 which extends parallel to the axis of the drum. The support arms 41 extend through arcuate recesses 42 (FIG. 2) in the side plate 30 to a cylindrical barrel cam 43 (FIGS. 2 and 3). The barrel cam 43 is stationary and is provided with two cam tracks or races 44 and 45 (see also FIG. 4). The cam followers of two of the pucks ride in one of the cam tracks, and the cam followers of the other two pucks ride in the other cam track. In FIG. 3 the barrel cam drum 43 is shown mounted adjacent diverting assembly 26. It will be understood, however, that the length of the arms 41 can be varied to permit proper coaction of the cam races 44 and 45 and the followers 40 regardless of the distance the barrel cam 43 is offset from the MD centerline of assembly 26.

Diapers 16 are serially fed to the drum 27 by an infeed conveyor 47 (FIG. 2) which includes an upper belt 48 and a lower belt 49. Diapers are delivered by the drum to an output conveyor 50 which transports the diapers to a stacker. The output conveyor includes a single upper belt 51 (see particularly FIG. 3) which rides over an idler roller 52 and four lower belts 53, 54, 55, and 56 which ride over pulleys 57, 58, 59, and 60. The input conveyor moves the diapers along an input path represented by the arrow 61 in FIG. 4, and the output conveyor moves the diapers along two output paths represented by the arrows 62 and 63. The lower belts 53 and 54 form one output path, and the lower belts 55 and 56 form the other output path.

The diapers are fed generally tangentially to the pucks 28a–d as the pucks rotate with the drum (see FIG. 2). Each puck is connected to the vacuum valve as it contacts the diaper, and the vacuum exerted on the diaper through the opening in the head 32 of the puck holds the diaper on the puck as the puck rotates from the input conveyor to the output conveyor.

As the drum and the pucks rotate, as from the input position (28a in FIG. 2) to the output position (28b in FIG. 2), the operating linkage 41 and co-related cam follower 40 cooperate with cam track 44 and cause every other (alternate) puck to be translated a pre-determined distance from a center line in the direction of product flow (MD), thus side-shifting alternate products so they discharge into lanes that are offset from the input lane. For example, in FIG. 4, the vacuum puck 28a is aligned with the center of the input conveyor 47 when a folded diaper first contacts the diverting assembly 26 (as at position 28a in FIG. 2). The vacuum puck 28b is in the discharge position and is aligned with the discharge path 62. As the diverting drum-like assembly 26 rotates the puck 28a to the diaper discharge position, transverse motion of the puck assembly will place the diaper being manipulated into alignment with one of the two discharge paths, in this instance discharge path 63 in FIG. 4. The puck 28a is illustrated in phantom at 28a' in the discharge position.

Still referring to FIG. 4, the cam follower 40 of the puck 28a rides in the cam track 45 as the drum rotates. The cam track 45 curves toward the right when locking in the direction of product flow so that the puck 28a would move axially to the right as illustrated in phantom at 28a' by the time the puck rotates to a position adjacent the output conveyor 50. In this position the puck 28a would be aligned with the output path 63. The curvature of the cam track 45 moves the puck 28a back to its position illustrated in solid in FIG. 4 as the drum completes one rotation.

The cam track 44 curves to the left as the next puck 28d rotates from the input conveyor 47 to the output conveyor 50. When the rotational position of the puck 28d is in the same as that of the puck 28a in FIG. 2, the puck 28d is aligned with the input path 61. As the puck 28d rotates to the discharge position (occupied by puck 28b in FIG. 2), the puck is moved transversely to the left by the cam track 44 into alignment with the output path 62. The cam track 44 moves the puck 28d back into alignment with the input path 61 as the drum rotates the puck into a position adjacent the input conveyor.

The cam follower of the puck 28c rides in the cam track 45, and the puck 28c moves like the puck 28a. The cam follower of the puck 28b rides in the cam track 44, and the puck 28b moves like the puck 28d. Retainer bars 64 on the ends of the slide rod prevent the pucks from moving off of the slide rods.

It is thus seen that the pucks will pick up individual diapers from the input conveyor and move them alternately into alignment with one of two output paths 62 and 63. The vacuum in each puck is cut off by the slug 38 as each diaper reaches the output conveyor, and the diapers are carried along one of the two output paths to a two-lane stacker of the type described in U.S. Pat. No. 4,325,475 to form two stacks of diapers. The output of the two-lane stacker can therefore be double the output of the single line stacker described in the patent.

FIG. 10 is a planar perspective view of the drum or wheel 66 of the diverting assembly 15 shown in FIG. 1. The drum includes a single side plate 67 which is mounted for rotation on a shaft 68 which is supported in frame 69. A cylindrical stationary barrel cam 70 is mounted on the frame coaxially with the shaft 68. Twelve pucks 71 (see FIG. 1) are mounted on the drum for transferring diapers from the input conveyor 17 to the output conveyor 18. Vacuum is supplied to each puck by a vacuum line 72 which communicates with a slot 73 of a vacuum valve as described with respect to the diverting assembly 26.

The four pucks indicated by the reference numeral 71a in FIG. 1 are fixed to the drum and rotate in a plane which is aligned with the input path defined by the input conveyor 17. The four pucks 71b and the four pucks 71c are mounted for axial sliding movement on support rods 74 (FIG. 10). Each pair of support rods extends through a radially oriented slide support 75 on which a vacuum puck is mounted. Cam followers 76 are connected to the slide support and, due to the shape of cam tracks in the barrel cam 70, cause transverse right or left motion to be imparted to the slide supports 75 and the associated vacuum pucks 71b and 71c. Retainer bars 77 on the ends of the rods 74 prevent the slide supports from moving off of the rods.

The barrel cam includes a center cam track 78 (FIGS. 5 and 10) and a pair of side cam tracks 79 and 80. The center cam track 78 lies in a plane which extends perpendicularly to the axis of the cam and the drum. The cam tracks 79 and 80 curve to the right and left, respectively, in the direction of cam follower motion (see FIGS. 5 and 6). The cam followers 76 associated with the pucks 71b ride in the cam track 79, and as the drum rotates, each of the pucks 71b moves from an input position in which it is aligned with the input path 81 of FIG. 10 to an output position in which it is aligned with the output path 82. The cam followers 76 of the pucks 71c ride in the cam track 80, and each of the pucks 71c moves between an output position which is aligned with the output path 84 of FIG. 10, and an input position which is aligned with the input path 81 of FIG. 10. Each of the cam followers 76 moves its associated puck laterally a distance equal to A of FIG. 5.

The pucks 71a are stationary with respect to the drum amd rotate in a plane which extends through the input path 81 and the output path 83. Alternatively, the puck 71a could be provided with a cam follower which rides in the center cam track 78.

The diverting assembly 15 of FIGS. 1 and 10 therefore diverts diapers from a single input path to three output paths. Every third diaper is diverted to one of the output paths, and the output conveyor transports the diapers to a three-lane-wide stacker.

Figure 6:
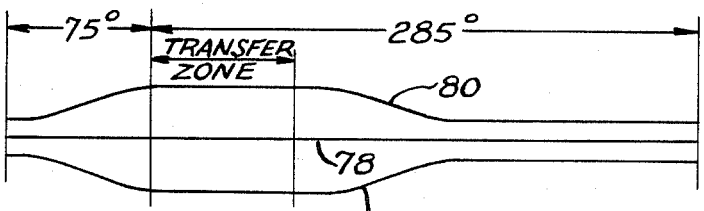
FIG. 6 is a planar illustration of the configuration of the cam of FIG. 5.
Figure 7:
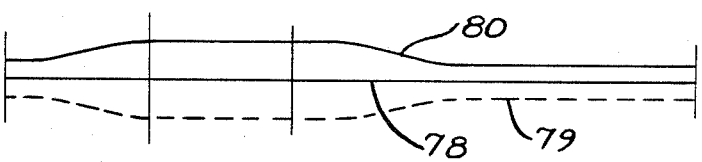
FIGS. 7 and 8 are views similar to FIG. 6 showing one of the cam tracks deactivated.
Figure 8:
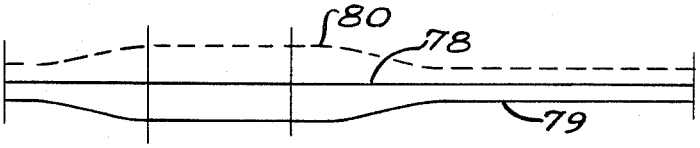

FIGS. 6–8 are diagrammatic illustrations of modifications which can be made to the movement of the pucks by the cam 70. In FIG. 6 the cam followers of the pucks 71a–c ride in the cam tracks 78–80, respectively, and the cam provides one lane input and three lane output. The drum rotates about 75° from the input conveyor to the "Transfer Zone" where the diapers are transferred to the output conveyor.

In FIG. 7 the cam followers of alternate pucks are positioned in the cam tracks 78 and 80, and no cam followers ride in the cam track 79. The cam therefore provides one lane input and two lane output, alternate diapers being moved to the left.

In FIG. 8 the cam followers of alternate pucks are positioned in the cam tracks 78 and 79, and no cam followers ride in the cam track 80. The cam therefore provides one lane input and two lane output, alternate diapers being moved to the right.

Figure 9:
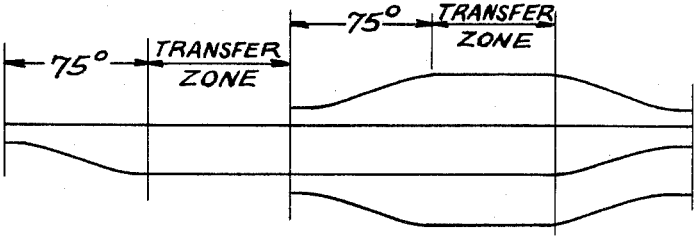
FIG. 9 is a planar illustration of the path of diapers when two diverting drums are used.

FIG. 9 illustrates one lane input and four lane output. This can be achieved by arranging two diverting assemblies 26 as illustrated in FIGS. 2–4 so that the first diverting assembly is in series with the other diverting assembly. The two output lanes of the first diverting assembly are inputs to the other diverting assembly which includes a four track barrel cam to divert from two input lanes into each of four output lanes.

While in the foregoing specification detailed descriptions of specific embodiments were set forth for the purpose of illustration, it will be understood that many of the details herein given may be varied considerably by those skilled in the art without departing from the spirit and scope of the invention.

I claim:

1. An apparatus for diverting serially fed product from an input path to a plurality of output paths, said apparatus comprising:
   a wheel mounted for rotation about an axis which is generally perpendicular to said input path and said output paths;
   a plurality of product control means on the wheel for moving product from said input path to said output paths, at least some of said product control means being movably mounted on said wheel for transverse movement perpendicular to product flow while the path of movement of said product control means generates a portion of a cylinder;
   a stationary barrel cam for moving said movable product control means transversely while said movable product control means is being moved in a curved path from said input to said output positions, the barrel cam being provided with a plurality of grooves; and
   a cam follower attached to each of the movable product control means, each of said cam followers being positioned in one of said grooves of the barrel cam whereby the cam followers are moved by the grooves of the barrel cam as the wheel rotates with respect to the barrel cam.

2. The apparatus of claim 1 in which each of said product control means comprises a vacuum holding device for holding said product under the influence of a vacuum and means for providing a vacuum to said vacuum holding device while the vacuum holding device rotates with the wheel between the input path and said output paths.

3. The apparatus of claim 1 in which said product control means delivers product to a first output path which is aligned with the input path and a second input path which is laterally offset from the input path.

4. The apparatus of claim 3 in which said product control means delivers products to a third output path which is laterally offset from the input path, the first output path lying between said second and third output paths.

5. The apparatus of claim 1 including input means for delivering diapers along the input path, output means for moving diapers along the output paths, and diaper stacking means for receiving diapers from the output paths and for stacking the diapers.

6. The apparatus of claim 1 including a flexible hose attached to each of said product control means and extending to a valve, said valve providing a vacuum to those flexible hoses which are attached to product control means while they are between the input path and the output paths.

7. An apparatus for providing multiple stacks of diapers comprising:
   input means for serially delivering individual diapers along an input path,
   output means for moving individual diapers along a plurality of output paths, said input path and said output paths lying in generally parallel planes,
   stacking means for receiving individual diapers from the output paths and for stacking the diapers into stacks of multiple diapers,
   a wheel interposed between said input means and said output means for rotation about an axis which is generally perpendicular to the planes of the input path and the output paths,
   a plurality of diaper pucks mounted on the wheel for rotation therewith, at least some of the pucks being mounted on the wheel for movement in a direction parallel to the axis of the wheel, each puck having an opening therein,
   means for providing a vacuum to the openings of the pucks when the pucks are moved in an arcuate plane between the input means and the output means whereby each puck can hold a diaper under the influence of the vacuum as the puck moves with the wheel between the input means and the output means,
   a stationary barrel cam for moving each of the movable pucks in a direction parallel to the axis of the wheel as the puck moves between the input means and the output means whereby each of the pucks is aligned with the input path when the rotating position of the puck is adjacent the input path and is aligned with one of the output paths when the rotating position of the puck is adjacent the output paths, said barrel cam being provided with a plurality of grooves, and
   a cam follower attached to each of said movable pucks and positioned in one of the grooves of the barrel cam whereby the cam followers and the movable pucks are moved by the grooves as the wheel rotates with respect to the barrel cam.

8. An apparatus for diverting serially fed product from an input path to a plurality of output paths, said apparatus comprising:
   a wheel mounted for rotation about an axis which is generally perpendicular to said input path and said output paths;
   a plurality of product control means on the wheel for moving product from said input path to said output paths, at least some of said product control means being movably mounted on said wheel for transverse movement perpendicular to product flow while the path of movement of said product control means generates a portion of a cylinder;

diverting means for moving said movable product control means transversely while said movable product control means is being moved in a curved path from said input to said output positions;

a second wheel aligned with one of said output paths and mounted for rotation about an axis which is generally perpendicular to said one output path, said second wheel being interposed between said one output path and a plurality of second output paths;

a plurality of second product control means on the second wheel for guiding product from said one output path to said second output paths, at least some of said second product control means being movably mounted on said second wheel for movement in a direction parallel to the axis of rotation of the second wheel between an input position in which the second product control means lies in a plane which extends through said one output path and an output position in which the second production control means lies in a plane which extends through one of said second output paths; and second diverting means for moving said movably mounted second product control means transversely on said second wheel between said input and output positions.

9. The apparatus of claim 8 in which each of said diverting means includes a barrel cam which is stationary with respect to the associated wheel, each of the barrel cams being provided with a plurality of grooves, each of said movably mounted product control means including a cam follower, each of said cam followers being positioned in a groove of one of the barrel cams whereby the cam followers are moved by the barrel cams as the wheels rotate with respect to the barrel cams.

* * * * *